United States Patent [19]
Mortensen et al.

[11] Patent Number: 4,755,407
[45] Date of Patent: Jul. 5, 1988

[54] FIRE-RESISTANT STRAP FABRIC, ARTICLE AND METHOD

[75] Inventors: John A. Mortensen, Little Silver, N.J.; Timothy A. Sands, Hughsville, Pa.; Mark P. Henderson, Chatham, N.J.; Richard P. Lee, Hagerstown, Md.; Linda B. Patterson, Martinsburg, W. Va.

[73] Assignee: C.M.Offray & Son, Inc., Chester, N.J.

[21] Appl. No.: 909,579

[22] Filed: Sep. 22, 1986

[51] Int. Cl.[4] .............................................. G02B 5/128

[52] U.S. Cl. .......................................... 428/36; 54/59; 220/88 R; 350/105; 428/143; 428/224; 428/241; 428/242; 428/257; 428/267; 428/283; 428/343; 428/354; 428/402; 428/406; 428/920; 428/921; 428/252; 428/913

[58] Field of Search ............... 428/143, 224, 241, 242, 428/267, 283, 402, 406, 920, 921, 343, 257, 36, 252, 913; 220/88 R; 350/105; 54/59

[56] References Cited

U.S. PATENT DOCUMENTS 4,272,564 6/1981 Grewe et al. ........................ 427/163
4,533,592 8/1985 Bingham ............................ 428/213
4,663,223 5/1987 Schweyen .......................... 428/240

*Primary Examiner*—James J. Bell
*Attorney, Agent, or Firm*—Mark T. Basseches; Paula T. Basseches

[57] ABSTRACT

A fire and wear-resistant strap material particularly useful in conjunction with fire fighting apparatus is disclosed. The strap material comprises a carrier fabric, the surfaces of which have been provided with a flexible retro-reflective coating permanently bonded thereto. The carrier fabric is preferably comprised of aramid yarns which, while having low abrasion resistance, are rendered highly wear-resistant by the retro-reflective coating, which also functions to minimize heat transfer to the supporting fabric.

18 Claims, 1 Drawing Sheet

FIRE-RESISTANT STRAP FABRIC, ARTICLE AND METHOD

BACKGROUND OF THE INVENTION

The present invention is directed to improvements in strap material and relates more specifically to a strap material especially useful in conjunction with fire fighting apparatus as hereinafter defined.

THE PRIOR ART

Portable fire fighting apparatus (such term to be broadly construed to include fire extinguishing devices of various sorts, life support systems, such as breathing apparatus, and other equipment used in environments likely to be subjected to flame or high heat conditions) typically embodies means or mechanisms for supporting the same on the body of the user. Such means for mechanisms comprise straps, belt and like body-encircling media for connecting the apparatus to the user.

In fire fighting environments the equipment as well as the support straps are likely to be subjected to high heat conditions, the heat being transmitted to the apparatus by conduction, convection and radiation.

As will be readily recognized, if the support straps of an often weighty fire fighting apparatus melt, char, burn or degrade under the ambient conditions encountered in fire environments, the results may be catastrophic, instances of such compromise of the support webs or belts having already been experienced, with resultant loss of life.

Attempts have been made to utilize metallic straps for fire fighting gear. The use of metallic support straps is counter-indicated. Although metallic materials are resistant to disintegration under high heat conditions, they are stiff and, hence, difficult to manipulate. Additionally, metallic straps are excellent conductors of heat and thus readily communicate heat to underlying garments of the fire fighter.

Straps made of conventional materials such as cottons or most polymers are unsatisfactory for use in high heat environments since they support combustion or melt or char at temperatures expected to be encountered.

It has likewise been proposed to manufacture straps of Nomex (a registered trademark of the DuPont Corporation), an example of the aramid family of fibers. While such material maintains its load carrying capacity to relatively high temperatures, the material does not melt but degrades at about 700° F. (371° C.) and retains 65% of its room temperature break strength after 1000 hours in dry air at 500° F. (260° C.). The material is expensive and will nonetheless be progressively compromised as a load carrying mechanism at temperatures significantly above 500° F. (260° C.).

Fabrics made of Nomex yarns have the further disadvantage that such material has a very low wear resistance. As a result a strap fabricated of such material will be rapidly frayed and mechanically weakened with repeated cycles of fastening and unfastening using conventional buckles or like clamp mechanisms.

SUMMARY OF THE INVENTION

The present invention may be summarized as directed to an improved strap material especially adapted for use in conjunction with fire fighting apparatus.

The invention is further directed to fire fighting apparatus embodying such strap material and a novel method of using such material.

The strap material of the present invention incorporates a base fabric which may comprise Nomex or a like heat resistant, although not necessarily wear-resistant, substrate.

The desirable properties of such material used as a strap may be synergistically improved by coating one or preferably both surfaces thereof with a retro-reflective layer comprised of a fire resistant adhesive or bonding material within which is suspended reflective flake material or the like, the surface of the fabric being defined by a multiplicity of closely spaced glass beads. The resultant strap material has been found to be capable of surviving and maintaining its structural integrity in high heat environments.

The improved heat resistance is considered to result from the reduced susceptibility toward absorption of radiant energy by virtue of the retro-reflective coating.

In addition the strap material is rendered highly resistant to wear by reason of the presence of the glass beads.

It is thus made possible, in accordance with the invention, to provide improved strap material and fire fighting apparatus employing the same which will maintain its structural integrity in high heat environments yet will be resistant to repeated fastenings and unfastenings of the strap material, thus enabling the use of heat-resistant but wear-susceptible fabrics.

A further benefit of the use of a strap material of the type described in conjunction with fire fighting apparatus resides in the fact that the retro-reflectivity of the strap material renders the location of fire fighters more easily ascertained.

It is accordingly an object of the invention to provide an improved strap material especially adapted for use in conjunction with and as a supporting strap for fire fighting apparatus.

A further object of the invention is the provision of an improved fire fighting apparatus and method of making the same incorporating a novel fabric strap.

Still a further object of the invention is the provision of a strap of the type described characterized in that the same comprises a fire-resistant fabric, one or preferably both surfaces of which have been coated with a retro-reflective layer having an outermost surface defined by glass beads or spheres.

The retro-reflective coating minimizes heat transfer to the underlying ground material, thereby enabling the use as such ground material of fabrics which, for one reason or another, are unsuitable as supports for fire fighting devices.

As will be pointed out hereinafter the coating, in a strap of the type described, exhibits multiple synergistic functions, namely, minimizing radiant heat transfer to the underlying fabric, stiffening the fabric, rendering the fabric highly resistant to wear of the type experienced when the same is laced through buckles and clamps and, of course, improving the ability to perceive the location of a fire fighter.

To attain these objects and such further objects as may appear herein or be hereinafter pointed out, reference is made to the accompanying drawings forming a part hereof, in which.

Figure 1:
FIG. 1 is a perspective view of a fire fighting apparatus in accordance with the invention.
Figure 2:
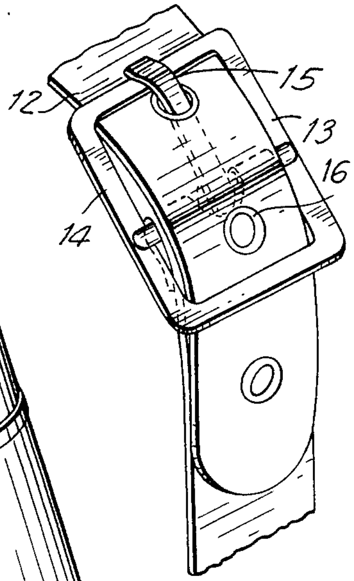
FIG. 2 is a magnified fragmentary view of a fastener component of the apparatus of FIG. 1.

Referring now to the drawings, there is disclosed in FIG. 1 a fire fighting apparatus 10 which, by way of non-limiting example, may comprise an oxygen or breathing apparatus, a fire extinguisher, rescue apparatus or the like 11.

As is conventional, the apparatus 11 is retained on the body of the fireman or rescue worker by one or more straps 12. It will be understood that the strap 12, while illustrated as passing over a shoulder of the wearer, may be a waist-encompassing belt, may be employed as the means for strapping components or elements of the apparatus to a harness, etc.

The strap 12 may be accommodated to the size of the user by connection with an adjustable clasp mechanism 13. In the illustrated embodiment, by way of example and without limitation, the fastener 13 comprises a buckle. It will be readily recognized that any of a number of alternate cinching or clamp devices, known per se, may be substituted for the buckle 13.

The fastener 13 includes a rectangular frame 14 through which the strap 12 is passed, the frame pivotally carrying a tongue 15 selectively engageable with any of a series of grommeted apertures 16 of the strap.

Since the invention is in no wise related to the structure of the fastener, further discussion thereof need not be undertaken. It is believed sufficient to note that, as is the case with virtually any fastener or cinching device, repeated drawing of the complemental attachment strap therethrough subjects the strap to significant wear.

Figure 3:
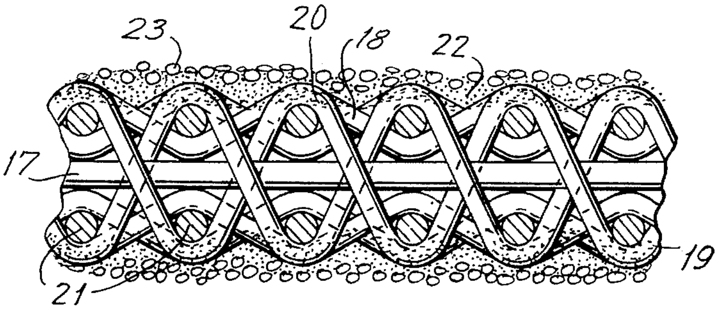
FIG. 3 is a magnified fragmentary longitudinal section taken on the line 3—3 of FIG. 2.

There is shown in FIG. 3, by way of example, an enlarged and diagrammatic section taken in the warpwise direction of a representative example of a fabric strap in accordance with the invention. The geometry of the fabric as illustrated in FIG. 3 should by no means be taken as limitative since numerous alternative fabric geometries have been found satisfactory and, hence, the specific configuration in non-critical except as may be defined in the appended claims.

Central to the instant advance is the invention and discovery that the formation of a retro-reflective coating on a surface, and preferably on both surfaces, of a strap material provides the strap with characteristics rendering the same especially desirable for use in conjunction with a fire fighting apparatus, and for that matter in any like applications where the strap is likely to be subjected to high heat conditions.

More specifically, it has been discovered that the application of a suitable retro-reflecting coating to a strap greatly extends the period during which the strap will maintain its breaking strength under high heat conditions, and particularly under conditions in which the strap is exposed to high levels of radiant energy.

In addition, the retro-reflective coating provides a rugged and wear-resistant surface which may repeatedly be engaged and disengaged from a clamping device, such as a buckle, clasp or the like.

The augmented wear-resistance of the strap is of particular importance in the fire control field since the polymers which are most highly resistant to heat, namely the aramids, have poor abrasion resistance characteristics.

While aramids are the preferred polymers under the present state of the art, it is to be understood that the retro-reflective coating is effective with all strap materials and thus will increase the time which any strap material is able to withstand high temperature conditions.

Means for applying a suitable flexible retroreflective coating are fully disclosed in U.S. Pat. No. 4,272,564 of June 9, 1981, owned by the assignee of the instant application, the disclosures of such patent being herein incorporated by reference.

Alternate means of forming reflective coatings are known to the art and are set forth in the patents cited and mentioned in the above referenced patent.

It is important to note that the adhesive composition identified in the above noted patent is not ideal for use in an application wherein the strap is likely to be subjected to high heat conditions. In lieu of the formulation set forth in the referenced patent, a satisfactory formulation is as follows (parts are by weight):

- 62% Impranil (registered trademark of Verone Dyestuff, division of Mobay Chemical Corp., Union, N.J.) an aliphatic polyester urethane solution 30% solids content
- 21.2% of a flame retardant additive compatible with the chemicals in the formulation, Pyron 331, (registered trademark of Chemonic Industries, Greensboro, N.C.) being a suitable example
- 6.2% aluminum powder, (litho non-leafing flake 11% maximum retention on 325 mesh screen)
- 8% Butane diol butyl glycidl ethers plus butyl hydroxy propylmethacrylate monomers
- 0.6% Benzoyl peroxide and zinc salts of 2-ethylheyanoic acid solution of methyl ethyl ketone
- 2% modified cycloaliphatic amine and aliphatic amine silane mixture The above formulation for the combined adhesive and flake material necessary to impart retro-reflectivity is set forth herein by way of example in compliance with the requirements of the Patent Statutes. It will be understood that variations in the formulation may be readily substituted by those skilled in the art, it being merely necessary to note that reflective particulate matter must be embedded in the adhesive, that the adhesive should be light transmitting, that the adhesive member should not support combustion, should be resistant to decomposition or melting under heat conditions, and should be of a viscosity to provide significant penetration of the fabric matrix next to be described.

Fabric penetration is particularly important where the base fabric employs aramid yarns since webs woven of aramid have an inherent flaccid or limp consistency and the adhesive desirably imparts a significant degree of stiffness to the web. The viscosity of the adhesive may be readily adjusted (i.e. by adjusting the solvent content) to vary penetration to suit the porosity and other characteristics of the web fabric.

Referring again to FIG. 3, a suitable fabric geometry preferably includes a woven assemblage employing a central stuffer warp 17. A tubular weave includes upper and lower sets of ground yarn ends 18, 19, respectively, and binder yarn ends 20. The filling or weft yarns are illustrated at 21.

Numeral 22 represents the adhesive-reflective particle component which, as diagrammatically illustrated in FIG. 3, penetrates into the body of the fabric, bonding firmly thereto to form, in addition to a support for glass beads 23, a stiffening mechanism for the strap 12.

Without limitation, a suitable 1" wide webbing having the fabric geometry hereinabove described and illustrated may be formed using:

Filling - 44 picks per inch 26's/2 ply black spun Nomex

Ground - 48 ends, natural Nomex 200 denier/4 ply

Binder - 14 ends, natural Nomex 200 denier/4 ply

Stuffer - 16 ends, 8's/2 ply natural spun Nomex

Stuffer - 4 ends, 3×7 steel wire cable type 304 stainless steel.

The stuffer ends 17 may alternate between the Nomex and the steel ends, the steel ends being spaced widthwise of the fabric so as to straddle the grommets 16 which engage with tongue 15 of the buckle.

Optionally, selvage portions, preferably also of Nomex, may be woven at the margins of the fabric.

As noted in U.S. Pat. No. 4,272,564, the beads, which are known per se, are preferably substantially spherical and may have an index of refraction in the area of 1.91 and average diameter of between about 0.0024 to 0.0035 inches.

In the strap of the instant invention the beads or spheres form a durable. wear-resistant coating over the underlying fabric.

As noted, the adhesive material provides the fabric with a desirable degree of stiffness.

The retro-reflective coatings are preferably applied one side at a time, as set forth in the above referenced patent.

A salient advantage of the instant strap material resides in the surprising ability of the retro-reflective coatings to protect the underlying ground fabrics from heat. Without limitation to any specific explanation for the surprising superiority of the retro-reflective coated fabric over an identical uncoated fabric, it is believed that the fabric of the invention tends in large measure to reflect radiant energy impinged on the fabric surface. In contrast, a high percentage of radiant energy impinged on uncoated fabric is absorbed by the fabric. The tendency toward absorption is increased in conventional strap materials since it is usual to employ dark colored fabrics in such applications.

From the foregoing it will be appreciated that there is disclosed in accordance with the invention an improved strap material especially desirable for use in situations where the same is used in a load carrying capacity in high heat environments.

The invention is further directed to an improved fire fighting apparatus (as such term is broadly defined) and to a method of making the same.

Numerous variations and modifications may occur to those skilled in the art and familiarized with the instant disclosure. Accordingly the same is to be broadly construed within the scope of the appended claims.

Having thus described the invention and illustrated its use, what is claimed as new and is desired to be secured by Letters Patent is:

1. As a new article of manufacture, a wear- and fire-resistant strap material for supporting a portable fire fighting apparatus on the body of a wearer comprising a flexible web of heat - and fire resistant-fabric, a heat- and fire-resistant adhesive coating formed on at least one surface of said web, said coating embodying a multiplicity of reflective particles, and a substantially continuous layer of transparent glass beads bonded by said adhesive coating to said fabric, said beads defining an outer layer of said strap.

2. A strap material in accordance with claim 1 wherein both surfaces of said web are covered by said coating.

3. A strap material in accordance with claim 1 wherein said web comprises a tubular woven fabric flattened to define a double thickness, the combination including fire-resistant warp yarns interposed between the layers defining said double thickness fabric.

4. A strap material in accordance with claim 3 wherein said fire-resistant warp yarns are comprised of metal, said warp yarns being recessed from the exposed surfaces of said fabric.

5. A strap material in accordance with claim 3 wherein said adhesive coating penetrates said layers of said fabric and functions to bond the said layers together.

6. A strap material in accordance with claim 1 wherein said fabric is comprised of aramid yarns.

7. A strap material in accordance with claim 6 wherein both surfaces of said web are covered by said coating.

8. In a fire fighting apparatus including a fastener device mounted thereon, a strap member secured to said apparatus and engageable with said fastener member for connecting said apparatus to the body of a wearer when said strap and fastener are in the engaged position thereof, characterized in that said strap member comprises a heat- and wear-resistant fabric web having on at least one surface thereof a retro-reflective coating, said coating being defined by glass beads, the beads being positioned substantially to isolate said fabric from contact with said fastener as said strap is engaged with and disengaged from said fastener.

9. An apparatus in accordance with claim 8 wherein both surfaces of said strap member are covered by said retro-reflective coating.

10. Apparatus in accordance with claim 8 wherein said web comprises a tubular woven fabric flattened to define a double thickness, the combination including fire-resistant warp yarns interposed between the layers defining said double thickness fabric.

11. Apparatus in accordance with claim 10 wherein said fire-resistant warp yarns are comprised of metal, said warp yarns being recessed from the exposed surfaces of said fabric.

12. Apparatus in accordance with claim 10 wherein said adhesive coating penetrates said layers of said fabric and functions to bond the said layers together.

13. Apparatus in accordance with claim 8 wherein said fabric is comprised of aramid yarns.

14. Apparatus in accordance with claim 13 wherein both surfaces of said web are covered by said coating.

15. Apparatus in accordance with claim 8 wherein said retro-reflective coating comprises a heat- and fire-resistant adhesive coating formed on said one surface of said web, said coating embodying a multiplicity of reflective particles and a substantially continuous layer of transparent glass beads bonded by said adhesive coating to said web.

16. The method of manufacturing a portable fire fighting apparatus or the like of the type which includes a fastener member connectable to a strap, said method comprising securing a carrier strap to said apparatus in position to engage said fastener member characterized in said carrier strap being comprised of heat- and fire-resistant fabric at least one surface of which is provided with a retro-reflective coating, the outermost boundary of said coating being defined by an essentially continuous layer of side-by-side disposed glass beads.

17. The method of claim 15 wherein both surfaces of said strap are covered by said coating.

18. The method of claim 16 wherein said strap comprises a tubular woven fabric flattened to define a double thickness, the combination including fire-resistant warp yarns interposed between the layers defining said double thickness fabric.

* * * * *